C. B. VAN HORN.
WHEEL.
APPLICATION FILED JULY 15, 1921.
1,433,435.
Patented Oct. 24, 1922.
2 SHEETS—SHEET 2.
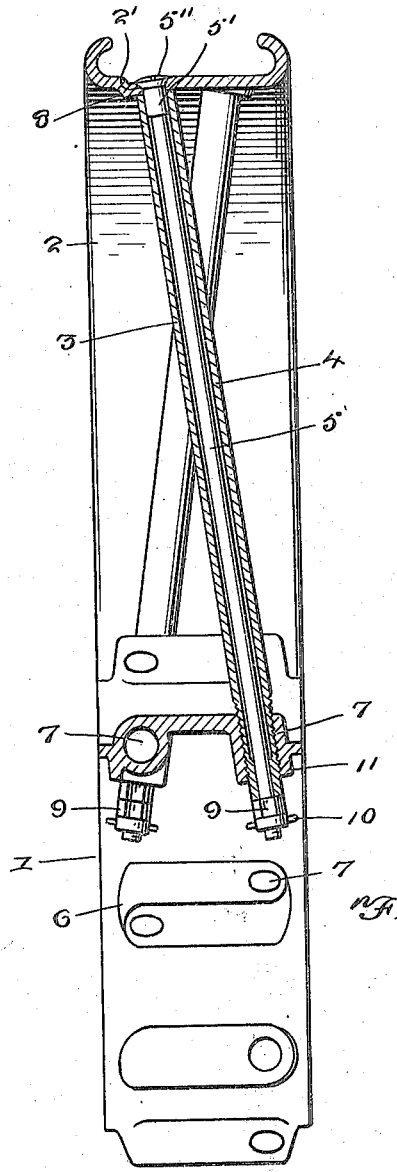
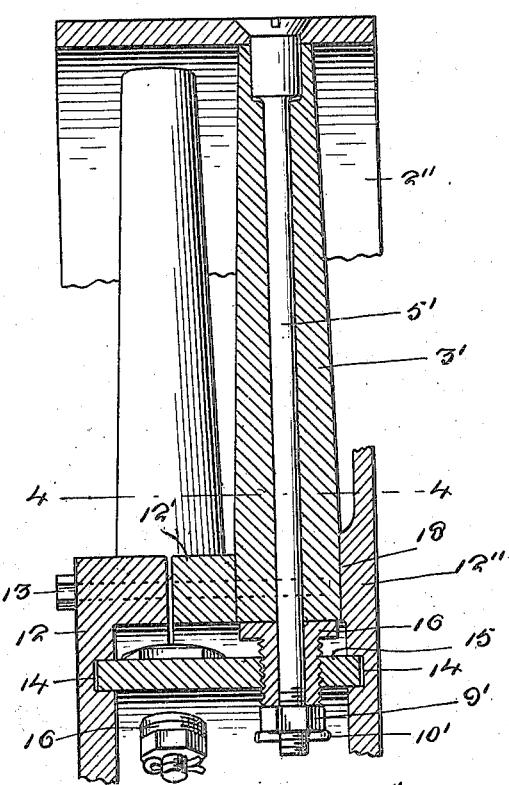
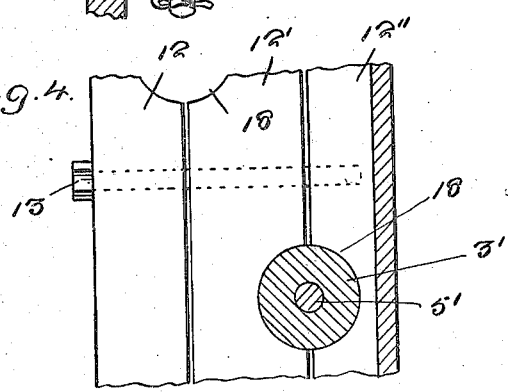

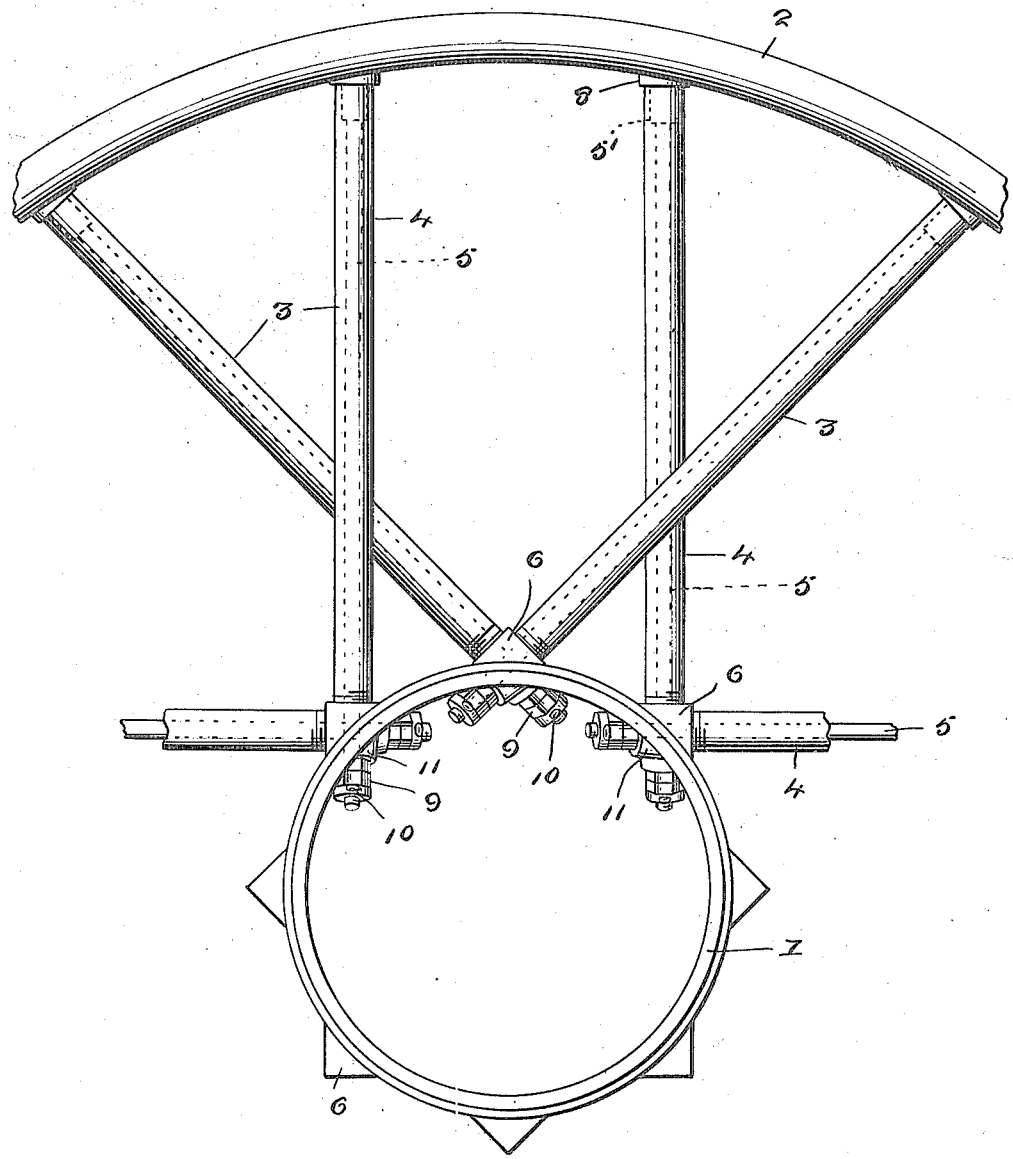

Patented Oct. 24, 1922.

1,433,435

UNITED STATES PATENT OFFICE.

CHARLES B. VAN HORN, OF WILLOW GROVE, PENNSYLVANIA.

WHEEL.

Application filed July 15, 1921. Serial No. 485,045.

*To all whom it may concern:*

Be it known that I, CHARLES B. VAN HORN, a citizen of the United States, residing at Willow Grove, in the county of Montgomery and State of Pennsylvania, have invented new and useful Improvements in Wheels, of which the following is a specification.

This invention relates to improvements in vehicle wheels, the general object of the invention being to provide spoke members for the wheel which act as tension and compression members in the movement of the wheel, the compression members acting to impart the rotary movement of the hub to the rim by a cushion action and the tension members exerting a pulling action on the rim, the pulling action and the cushion action being simultaneous at any part of the revolution.

Another object of the invention is to provide adjusting means for the spokes so that the wheel can be kept true.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of a part of a wheel constructed in accordance with my invention.

Figure 2 is a transverse sectional view through Figure 1.

Figure 3 is a similar view of a modification.

Figure 4 is a section on line 4—4 of Figure 3.

Referring to Figures 1 and 2, 1 indicates an interior ring which will be suitably connected with the hub of the wheel. 2 indicates an exterior ring which may be shaped to form the rim or which may have a rim suitably secured thereto. These rings are connected together by the spokes 3, each spoke consisting of a tubular exterior part 4 and a rod like interior part 5. These parts are so arranged that the part 4 forms a compression member and part 5 a tension member. The spokes are tangentially arranged and they are also arranged in pairs, the spokes of each pair being at right angles to each other. Each pair of spokes engages a lug 6 on the interior ring, the outer faces of each lug being at right angles to each other and being tangent to the ring. Each of these faces is provided with a screw threaded hole 7, the holes being arranged adjacent opposite ends of the faces, as shown in Figure 2. These holes receive the screw threaded inner ends of the tubular members 4 so that said tubular members can be adjusted longitudinally by screwing them in or out of said holes. The outer ends of said tubular members engage bosses 8 formed on the inner circumference of ring 2, the faces of said bosses being flat so that they are parallel with the faces of the lugs 6. The rod like members 5 have enlarged outer ends 5' with screw heads 5'', these heads being countersunk in holes 2' formed in the ring 2. The enlarged parts of the heads engage the outer ends of the bores of the tubular members. The inner ends of the members 5 pass entirely through the tubular members and project beyond their inner ends, these projecting portions being screw threaded to receive the nuts 9, the nuts being held in place by the cotter pins 10. As these nuts 9 engage the inner ends of the tubular members they will act to draw the rods 5 inwardly and thus hold the exterior ring against the tubular members. The inner ring is provided with small lugs 11 on its inner circumference which are opposite the lugs 6 and the screw threaded holes 7 are continued through these lugs. Thus these screw threaded holes 7 are of considerable length. The spokes are inclinedly arranged, one spoke of each pair inclining towards the inner side of the wheel and the other spoke of each pair inclining towards the outer side of the wheel.

As will be seen from Figure 1 during a part of the revolution of the wheel some of the tubular members will exert a pushing effect upon the outer ring 2, if the hub is being rotated, while some of the members 5 could be exerting a pulling effect so that all compression and tension strains and stresses are compensated for. The action of the spoke elements will also come into effect when the brakes are applied.

By having the interior and exterior spoke elements adjustable the wheel parts can be easily and quickly trued and these parts also facilitate the assembling of the wheel.

In the modification shown in Figures 3 and 4 the interior ring is formed of three parts 12, 12' and 12", the three parts being connected together by the bolts 13. The exterior parts 12 and 12" are provided with annular grooves 14 on their inner faces for receiving the edges of a ring 15 which carries the screw threaded members 16 for engaging the inner ends of the exterior spoke elements 3'. These elements are preferably formed of wood and are of tapered shape with their large inner ends engaging semi-circular recesses 18 formed in the ring sections 12, 12' and 12". The outer ends of the spoke elements 3' engage the exterior ring 2'. The rod elements 5' pass through the elements 3' and through the members 16 and have their inner ends screw threaded to receive the nuts 9', which bear against the inner end of a member 16. Cotter pins 10' lock the nuts in place. The action of this construction of wheel is similar to that before described, the main differences being that the tubular elements 3' do not have their inner ends screw threaded but are adjusted by the screw threaded members 16 engaging screw threaded holes in the ring 15. The interior ring is made in sections to permit the tubular elements 3' to be positioned. The spoke elements in this construction are not inclined as are the spoke elements in the first construction though the spokes in the modification are staggered.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A vehicle wheel comprising an exterior ring and an interior ring, spoke elements connecting the rings together, said elements being arranged in pairs with the elements of each pair extending at right angles to each other and each element consisting of an interior tension member and an exterior compression member.

2. A vehicle wheel comprising an exterior ring and an interior ring, spoke elements connecting the rings together, said elements being arranged in pairs with the elements of each pair extending at right angles to each other and each element consisting of an interior tension member and an exterior compression member, and means for adjusting both members longitudinally.

In testimony whereof I affix my signature.

CHARLES B. VAN HORN.